(12) United States Patent
Zagorouiko (10) Patent No.: US 7,373,936 B1
(45) Date of Patent: May 20, 2008

(54) PORTABLE FINISHING APPARATUS FOR HARD MATERIAL

(76) Inventor: Viateheslav Zagorouiko, 6171 Roger St., Jupiter, FL (US) 33458

( * ) Notice: Subject to any disclaimer, the term of this patent is extended or adjusted under 35 U.S.C. 154(b) by 66 days.

(21) Appl. No.: 11/567,668

(22) Filed: Dec. 6, 2006

(51) Int. Cl.
*B28D 5/04* (2006.01)

(52) U.S. Cl. .......................................... 125/38; 451/11

(58) Field of Classification Search ............ 125/36–38, 125/23.01; 451/11, 65, 341, 360, 367, 461, 451/159, 160, 119, 120, 124, 150, 158, 162
See application file for complete search history.

(56) References Cited

U.S. PATENT DOCUMENTS

| | | |
|---|---|---|
| 2,014,229 A | 9/1935 | Emmons |
| 2,291,058 A | 7/1942 | Pohl |
| 3,164,144 A | 1/1965 | Adams |
| 3,323,507 A | 6/1967 | Schuman |
| 3,360,298 A | 12/1967 | Stoljarov |
| 4,054,179 A | 10/1977 | Destree |
| 4,228,617 A | 10/1980 | Bando |
| 4,552,122 A | 11/1985 | Kelly |
| 4,584,794 A * | 4/1986 | Hirohata .................... 451/160 |
| 4,979,412 A | 12/1990 | Anders |
| 5,482,026 A | 1/1996 | Russell |
| 5,588,418 A | 12/1996 | Holmes et al. |
| 5,960,780 A | 10/1999 | Harris |
| 6,006,735 A | 12/1999 | Schlough et al. |
| 6,062,122 A | 5/2000 | Niemczyk |
| 6,073,621 A | 6/2000 | Cetrangolo |
| 6,106,366 A * | 8/2000 | Dixon et al. ................... 451/10 |
| 6,131,557 A * | 10/2000 | Watson ..................... 125/13.01 |
| 6,257,225 B1 | 7/2001 | Harris |
| 6,276,990 B1 * | 8/2001 | Greenland .................... 451/11 |
| 6,315,799 B1 * | 11/2001 | Toniolo ........................ 451/65 |
| 6,712,061 B1 * | 3/2004 | Kalb ............................ 125/10 |
| 6,793,566 B2 * | 9/2004 | Owen ......................... 451/342 |

* cited by examiner

*Primary Examiner*—Dung Van Nguyen
(74) *Attorney, Agent, or Firm*—McHale & Slavin, P.A.

(57) ABSTRACT

The instant invention relates to power tools. More specifically, the instant invention is a portable device for shaping, contouring and polishing the edge of a workpiece consisting of a hard material. The device includes a guide-way constructed and arranged to attach directly to the upper surface of the workpiece. A carriage is slidably supported on the guide-way for movement along the length thereof. Secured to the carriage is a motor for rotation of a rotary tool. A pneumatic cylinder is provided to force the rotary tool into the workpiece with a predetermined pressure along a predetermined axis of approach. The carriage is constructed and arranged for vertical positioning and angular rotation of the rotary tool.

18 Claims, 12 Drawing Sheets

PORTABLE FINISHING APPARATUS FOR HARD MATERIAL

FIELD OF THE INVENTION

This invention generally relates to the field of power tools, and more particularly to a portable device for sawing, contouring and polishing the edges of stone, glass and other hard materials.

BACKGROUND OF THE INVENTION

Stoneworking is a very old art, dating back to the days of cave dwellers when man is presumed to have first taken shelter within a stone structure. However, the age of the art should not be confused with the level of technology in use today. The desirability of stone in dwellings, for various monuments and markers, and in many other applications continues to be great, owing to intrinsic hardness and resistance to the elements, a wonderful array of diverse natural and enhanced appearances, temperature resistance, thermal mass, low thermal expansion, and other desirable and unusual features. In addition to natural stone, synthetic or artificial stone, stone-containing materials, or stone-like materials are also being manufactured for desired characteristics. Consequently, much modern technology has been applied to further the provision of stone into the marketplace.

Natural stone is quarried in large blocks from mines and is normally next cut into thinner slabs. These slabs are polished on one surface and then typically sold into commercial or construction applications. Exemplary construction applications, though not by any means all-inclusive, are wall surfaces and decorations for both interior and exterior, trim, fireplaces, flooring, table tops, and counter tops. Rarely will the polished slab have the exact dimensions required for a given project. Consequently, the slab must be cut to fit the application. Depending upon the application, once the slab has been cut, the edge may need additional finishing, which may include leveling, shaping and polishing steps. Shaped and polished edges are typically created by grinding the surface with increasingly finer grits of abrasives. The abrasives are normally cooled with a fluid, typically water. As is known in the industry, the cutting, shaping and polishing operations release a large quantity of abrasive, in the form of slurry and dust, which can be quite detrimental to machines and equipment which are not designed to withstand the erosive environment.

Where large quantities of natural stone or stone-like materials are to be cut and polished, relatively massive equipment has been designed and constructed which facilitates the cutting and polishing operations. These machines are generally designed to have enormous mass, which makes the tools much more rigid and also less susceptible to vibration and flexure that may otherwise occur. While these tools are well suited for operations where stones may be readily transported to the machine, they clearly have no utility for stones to be worked in situ at a construction location or the like. Furthermore, these machines tend to be extremely expensive, therefore custom production on this type of machine results in undesirably large amounts of very expensive idle time. Not only do stones need to be changed often for custom production, but the machine will also typically require reconfiguration and/or realignment for the custom job. Furthermore, the transport of a stone to and from a construction site to effect the custom work is not only expensive and the source of much delay, but the likelihood of an accident which destroys the stone is much greater with the additional transport. Finally, these large machines tend to be cost-prohibitive for a smaller shop that is not continuously using the machine. Exemplary patents that illustrate large commercial stone working machines include Adams in U.S. Pat. Nos. 3,164,144; 4,228,617 to Bando; U.S. Pat. No. 5,482,026 to Russell; U.S. Pat. No. 6,006,735 to Schlough et al; U.S. Pat. No. 6,073,621 to Cetrangolo; and U.S. Pat. No. 6,315,799 to Toniolo.

In an attempt to provide a more portable machine which may, for example, be used directly at a job site, other artisans have proposed various rail systems which are clamped or otherwise anchored to stone or other hard material, such as concrete or glass. These rails may act as guides, such as in U.S. Pat. No. 2,014,229 to Emmons; U.S. Pat. No. 4,552,122 to Kelly; U.S. Pat. No. 5,960,780 to Harris; U.S. Pat. No. 6,062,122 to Niemczyk; and U.S. Pat. No. 6,257,225 to Harris; or may alternatively act as a track which supports a trolley or the like. Exemplary trolleys are shown in U.S. Pat. No. 2,291,058 to Pohl; U.S. Pat. No. 3,323,507 to Schuman; U.S. Pat. No. 3,360,298 to Stoljarov et al; U.S. Pat. No. 4,054,179 to Destree; U.S. Pat. No. 4,979,412 to Anders; and U.S. Pat. No. 5,588,418 to Holmes et al. An additional device uses a router with a profiled cutter for shaping and polishing edges. The profiled cutter is an abrasive, and is generally extremely expensive. The nature of these devices only permits the shaped cutter to move into the workpiece along a single axis, causing uneven wear of the cutter. Consequently, a profiled cutter loses its shape with use and creates an edge which varies. This edge will not match the profile of the next cutter of finer grit, and so the next cutter will not make full contact to the edge of the stone. To achieve a polished edge, the mason will need to go back and rework spots or regions missed by mismatched profiles.

For a single cutting operation, many of these devices have found utility in the industry, and rightly so. Providing a guiding edge for an abrasive saw or other cutter, such as is used to cut stone and other hard materials, is of much benefit for custom applications and are frequently required at a building site. When a section of flooring or wall requires custom cutting and fitting, it is not always practical or reasonable to expect a stone factory to size the stone to the needs in advance. Moreover, it may not always be possible to accurately predict the dimensions owing to variability such as spacing between adjacent stone and the like. Furthermore, the thickness of adjacent stones may vary somewhat unpredictably, and the leveling of the intersection of the two stones may be a very important finishing operation.

Unfortunately, many of the prior art devices are designed for only very light duty. Where guides are used, they tend to lack the necessary resistance to abrasion from the stoneworking dust, and consequently have a limited life only suited for very light duty stone working. These machines also illustrate single tool applications. So, when a stone mason identifies the need for a tool to assist with the guiding of a stone cutting saw, he must purchase a guide for his saw. Later, when he elects to purchase a guide for another stone working tool such as a polisher or an edger, he must then purchase another piece of equipment. This single function tool holding and guiding is not highly desirable, and so many masons will perform all but the most complex or sizeable jobs by hand. As is all too well known, when work is completed by hand, there is much greater risk that the mason will err in the process, and this error is not readily remediated in stone. Consequently, the probability for unsightly imperfections or total loss of valuable stone, and the additional work required to remake a destroyed piece or repair an imperfection provides much incentive in the industry for better tools to reduce the dependence upon hand operations. Additionally, the freehand shaping and polishing is very strenuous and time consuming, significantly increasing cost to the consumer.

In addition to the limitations aforementioned, another shortcoming of the prior art apparatus is the ability to guide and form inside openings and corners such as are typically found in the installation of a kitchen or bar sink within a stone counter top. In order to cut this type of hole with inside corners, it is most desirable to drop the saw vertically onto the stone to begin the cut in a predetermined place. Where the design of the cutting guide requires the saw to traverse from an end or edge of the stone, such a guide will have no applicability to the holes created for sinks.

What is desired then is a portable apparatus which enables a stone mason or worker of other hard material to purchase a single apparatus which will perform the precise guiding of diverse tools across the hard material. A need furthermore exists for an apparatus which will allow a mason at a job site to form precise inside holes, shapes and polished surfaces.

The device should be portable and capable of being quickly assembled for use and disassembled for transport. The apparatus should be adapted to move shaped cutting tools into the edge of a workpiece at an acute angle for even tool wear. The apparatus should also be constructed to supply an even pressure to the rotating tool regardless of the depth of cut. The device should also be capable of repeated, accurate traversal along the edge of the workpiece for matching of adjacently positioned pieces.

SUMMARY OF THE INVENTION

The instant invention relates to power tools. More specifically, the instant invention is a portable device for shaping, sawing, contouring and polishing the edges of a hard material. The device includes a guide-way constructed and arranged to attach directly to the upper surface of the hard material workpiece. A first carriage is slidably supported on the guide-way for movement along the length thereof. A second carriage is secured to the first carriage for traversal along an axis of approach having an acute angle. A motor is secured to the second carriage for rotation of a rotary tool. A pneumatic cylinder is provided to force the rotary tool into the workpiece with a predetermined constant pressure along the axis of approach. The second carriage is also constructed and arranged for vertical positioning and angular positioning to allow for various edge configurations.

Accordingly, it is a primary objective of the instant invention to provide a portable and easily assembled apparatus for cutting and finishing the edges of hard materials.

It is another objective of the instant invention to provide a portable hard material finishing apparatus wherein a rotary tool is advanced into the workpiece at an acute angle for reduced tool wear.

It is yet another objective of the instant invention to provide a portable hard material finishing apparatus having a fluid operated cylinder to provide consistent force for advancement of a rotary tool into a workpiece of hard material.

It is a further objective of the instant invention to provide a portable hard material finishing apparatus having a bearing system which includes pressurized fluid for expelling dust and debris from the bearing surfaces.

It is yet a further objective of the instant invention to provide a portable hard material finishing apparatus having extruded hard anodized guides of a unique shape cooperating with polymeric followers.

It is still yet a further objective of the instant invention to provide a portable hard material finishing apparatus having more than one rotary tool.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
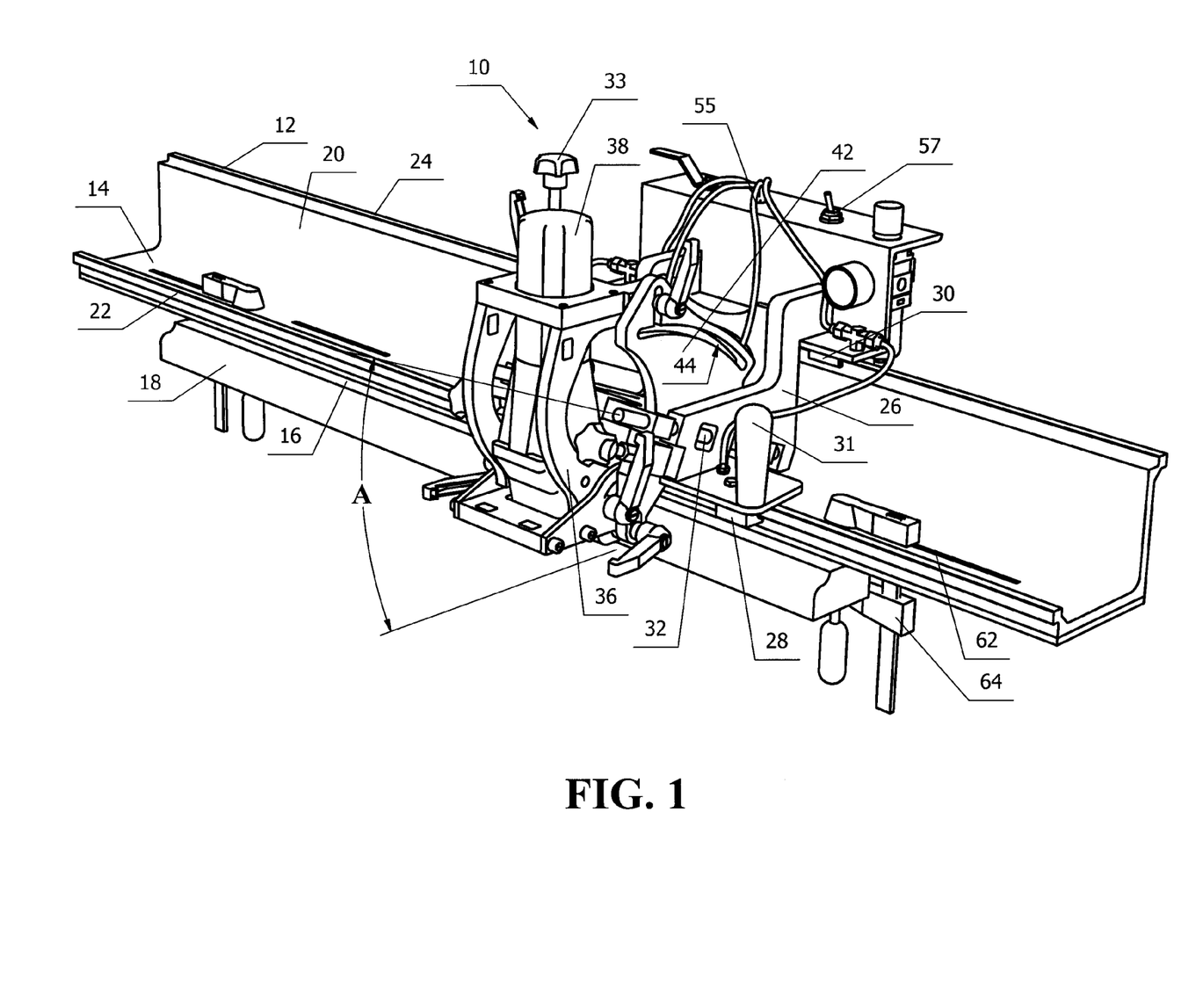
FIG. 1 is a front perspective view of one embodiment of the instant invention.

Referring to FIG. 1, a finishing apparatus 10 for cutting, shaping and polishing the edges of a hard material is illustrated. The finishing apparatus includes a guide-way 12 having a horizontal member 14 constructed and arranged for being secured parallel with and juxtaposed to an upper surface 16 of a hard material workpiece 18 to provide rigidity in a first plane, and a vertical member 20 extending upwardly with respect to the upper surface of the workpiece 16 to provide rigidity in a second plan. The horizontal member 14 includes a first bearing surface 22 and the vertical member 20 includes a second bearing surface 24.

A first carriage 26 is slidably secured to the guide-way 12 for movement along the length thereof. The carriage includes at least one, and preferably two, first bearing follower(s) 28 constructed and arranged for sliding cooperation with the first bearing surface 22. The carriage also includes at least one, and preferably two, second bearing follower(s) 30 constructed and arranged for sliding cooperation with the second bearing surface 24.

Figure 3:
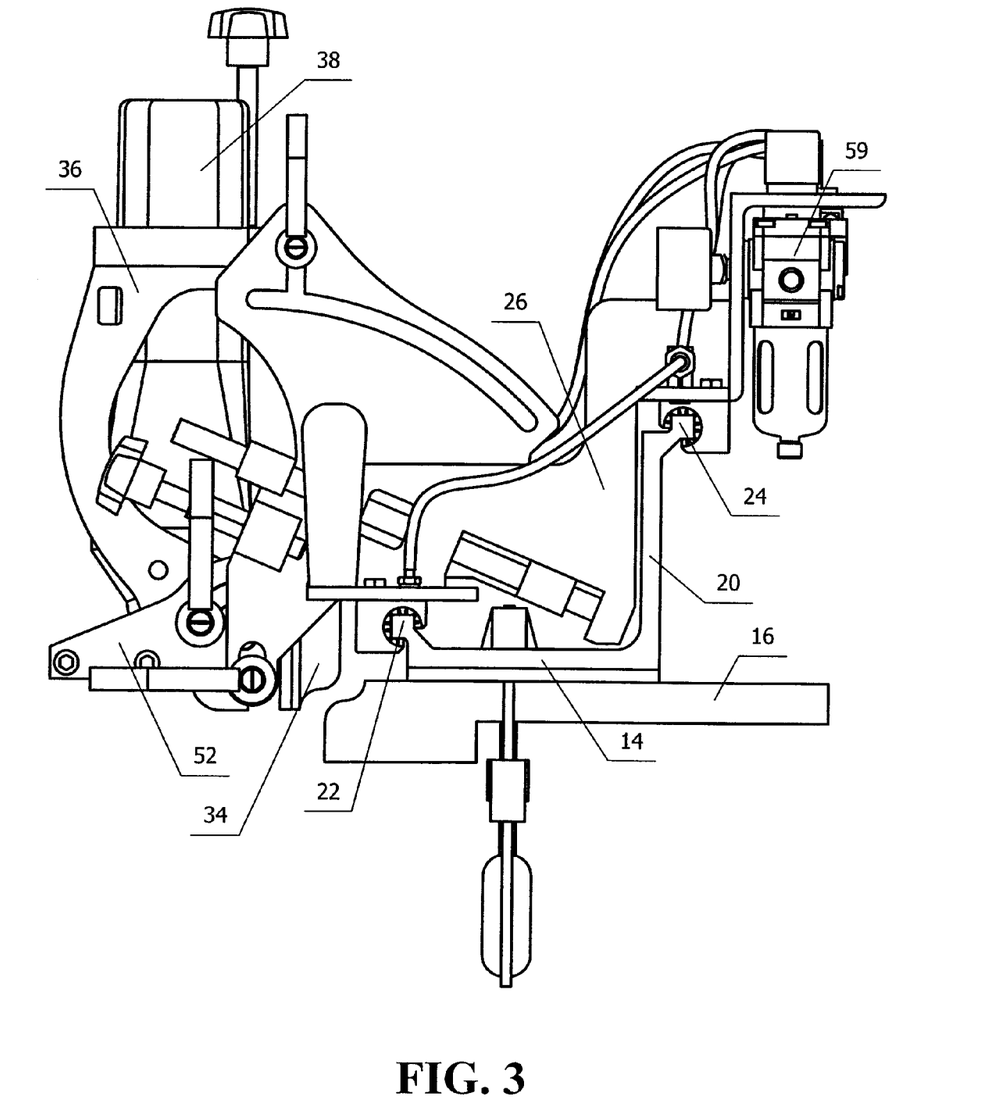
FIG. 3 is a right end view of one embodiment of the instant invention.
Figure 11:
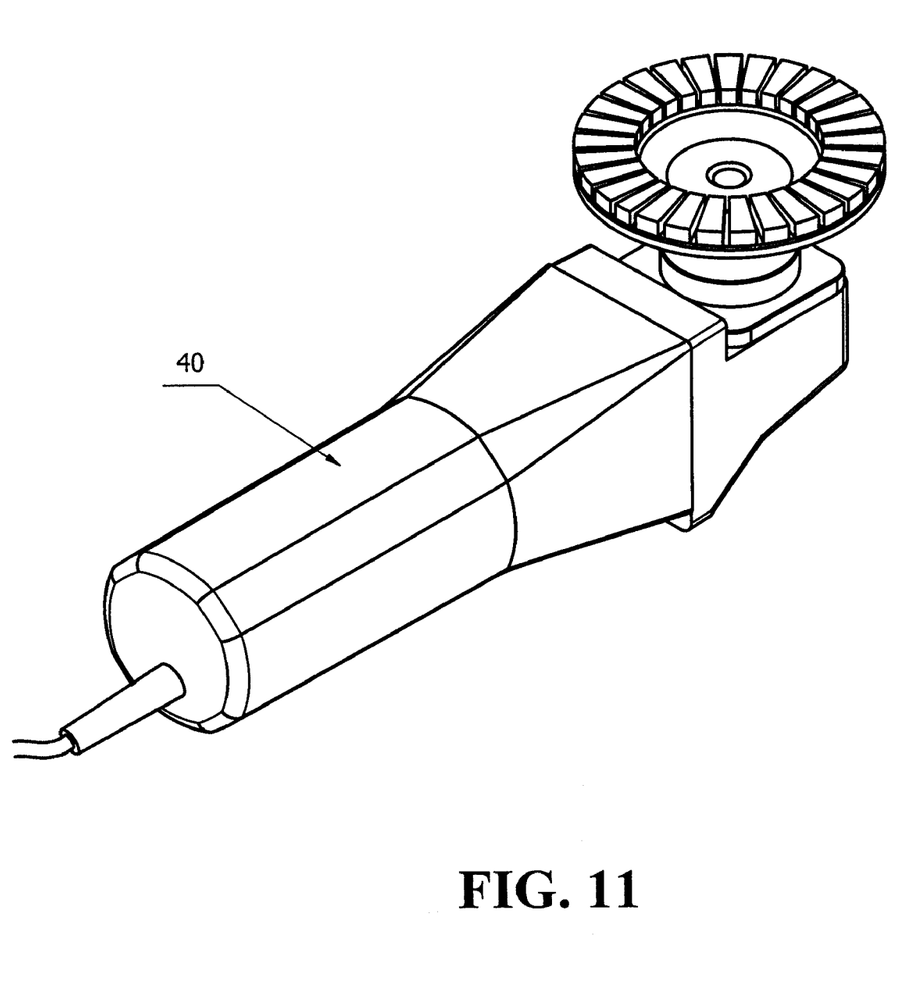
FIG. 11 is a perspective view of a motor and rotary tool suitable for use with the instant invention.
Figure 12:
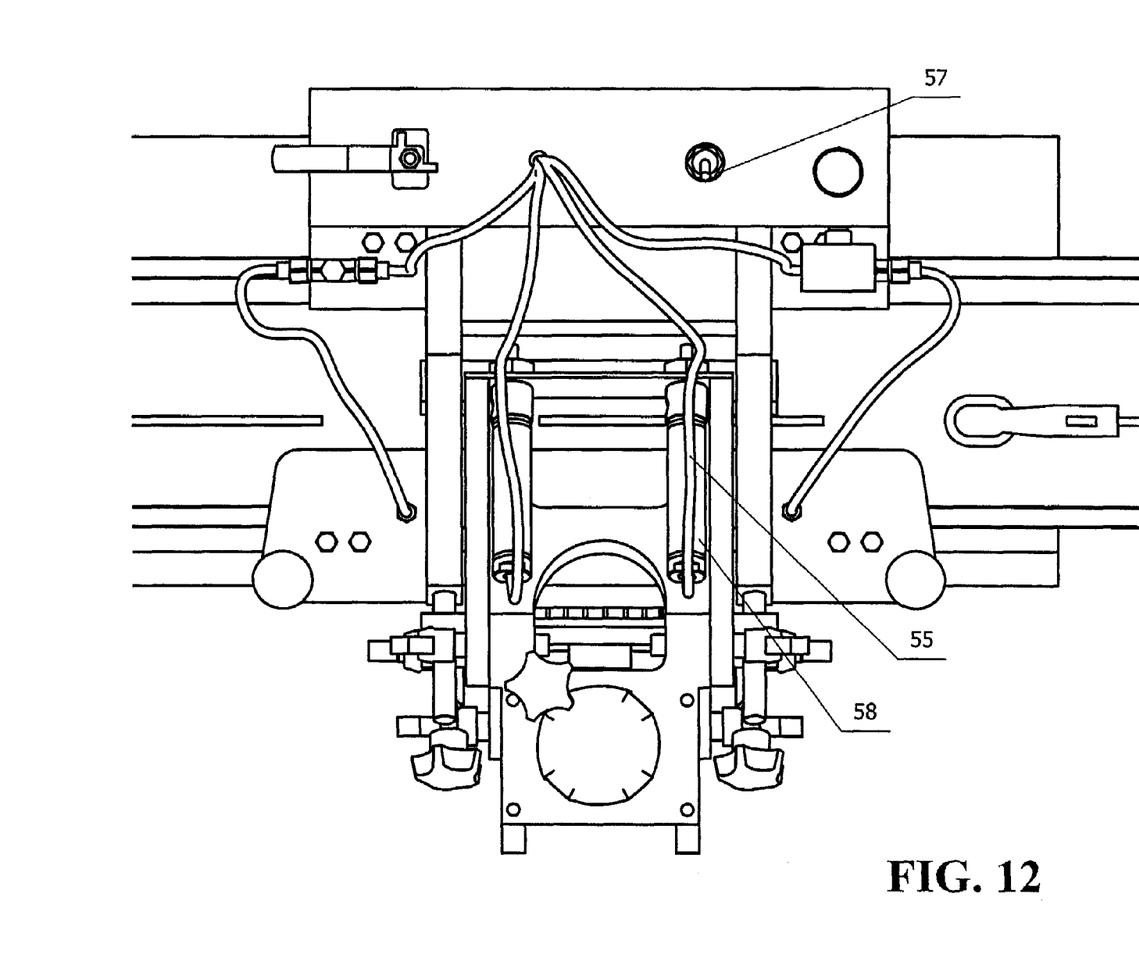
FIG. 12 is a partial top view, illustrating the motor and rotary tool in a perpendicular position.

A second linear guide-way 32 is secured to the first carriage 26 defining an axis of approach for a rotatable tool 34 (FIG. 3). The second guide-way 32 extends upward and outward at an acute angle A with respect to the horizontal member 14. In a most preferred embodiment the axis of approach is 22.5 degrees. However, it should be noted that an axis of approach between 3 and 87 degrees may be utilized without departing from the scope of the invention. The axis of approach reduces uneven tool wear and improves surface finish by distributing tool pressure across a larger area of the rotatable tool 34 as the tool is advanced into the workpiece. The axis of approach also maintains a more consistent cutting speed at the interface between the rotatable tool 34 and the workpiece 18. This is especially true when a corner rounding cutting tool is used for rounding the edge of a workpiece. A second carriage 36 is slidably secured to the second guide-way 32 and a motor 38 and rotatable tool 34 are operably secured to the second carriage. In a most preferred embodiment the motor and rotatable tool are components of an angle grinder 40 (FIG. 11). Angle grinders are readily available in the marketplace and therefore worn and/or broken components are easily replaced. In addition, various saw blades and shaped cutters are available for use on the device. In this manner, the rotatable tool may be advanced into an edge of a workpiece along the axis of approach and the first carriage may be traversed back and forth along the guide-way for finishing an edge of said workpiece via handle(s).

Figure 9:
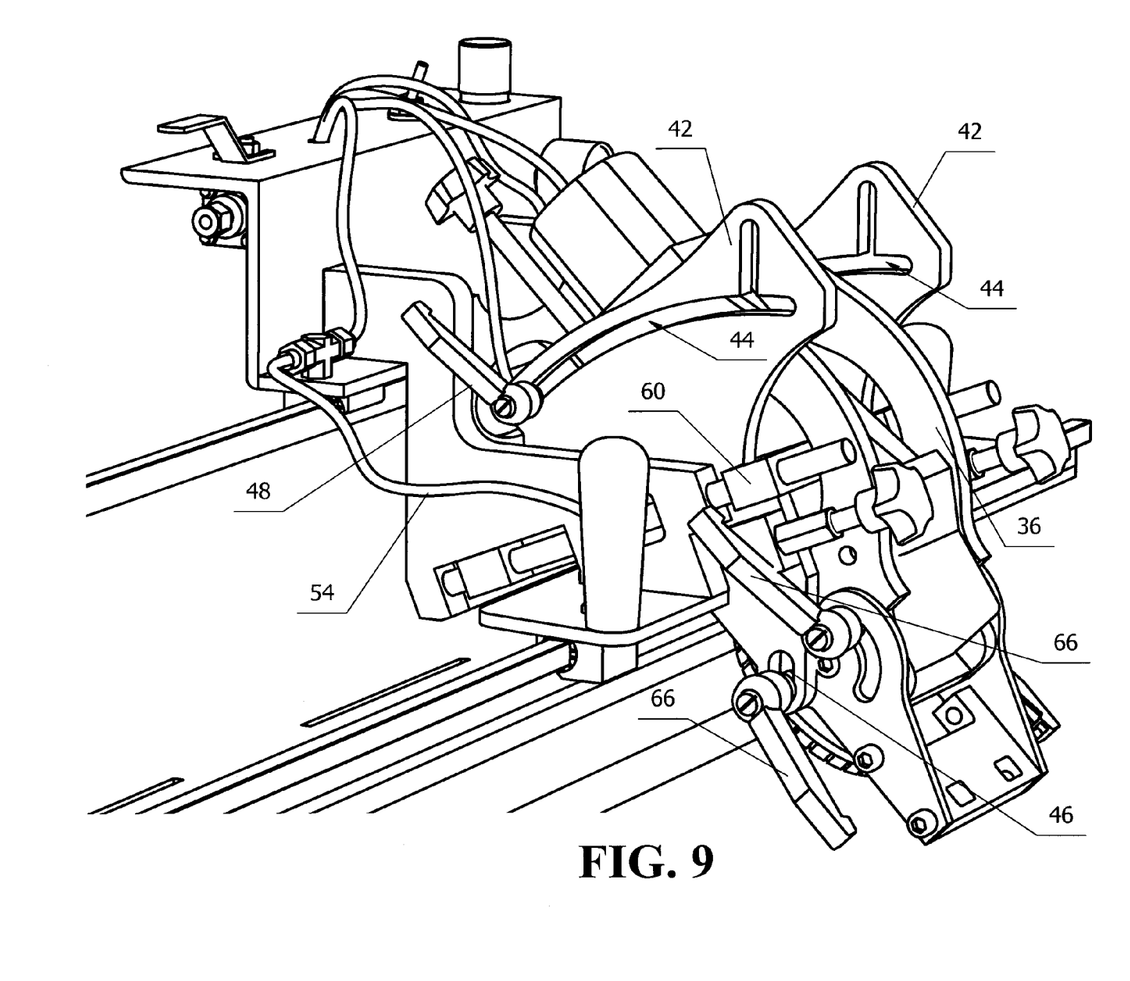
FIG. 9 is a left front perspective view, illustrating the motor and rotary tool in a rotated position.
Figure 10:
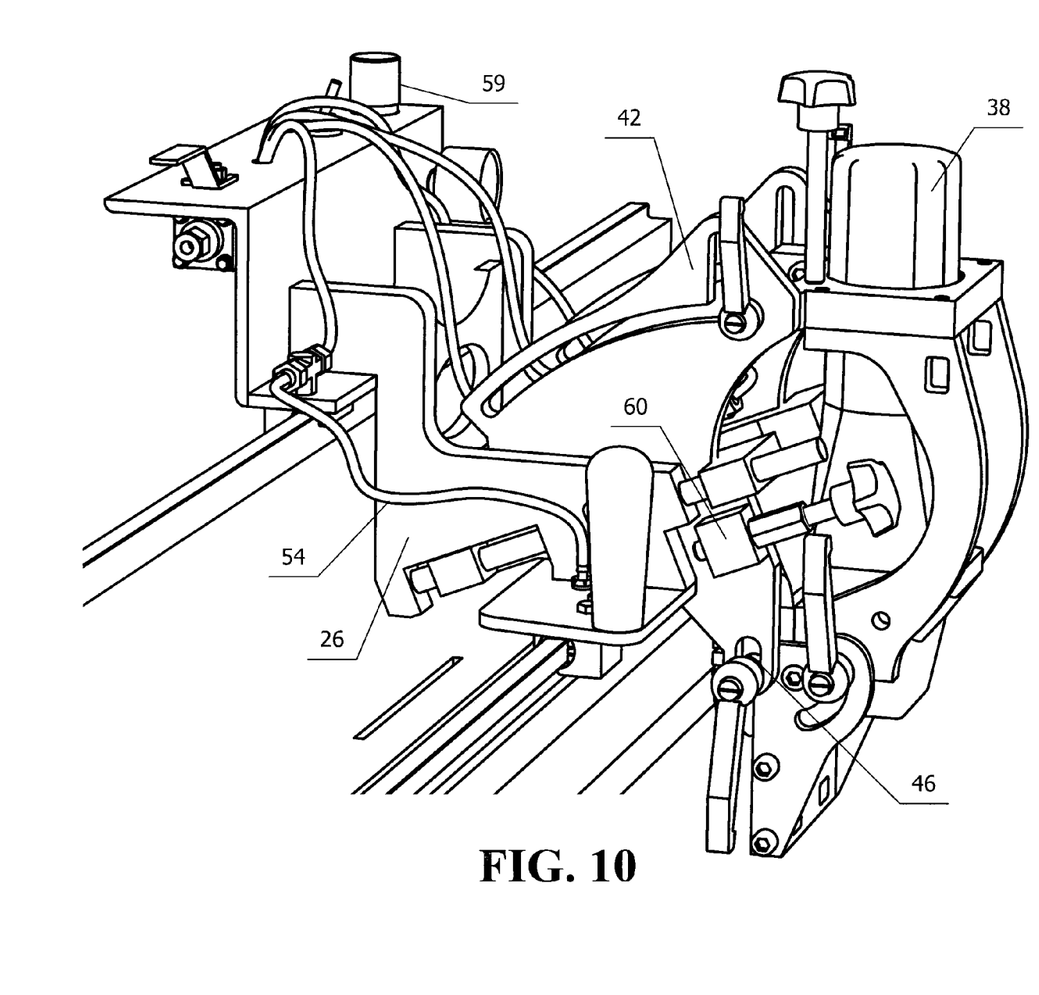
FIG. 10 is a left front perspective view.

Referring to FIGS. 9-10, one embodiment of the instant invention is illustrated. In this embodiment the second carriage includes two substantially parallel plates 42. The top portion of the plates each include an arcuate slot 44 for attachment of the top portion of the angle grinder 40 while the bottom portion of the plates includes an aperture and pin arrangement 46 defining an axis of rotation for the angle grinder. As illustrated in FIG. 9, hand levers 48 may be loosened to allow the top portion of the rotary tool to be pivoted throughout the range of the arcuate slots. This arrangement permits bevels and the like to be easily formed along the edge(s) of the workpiece.

Figure 4:
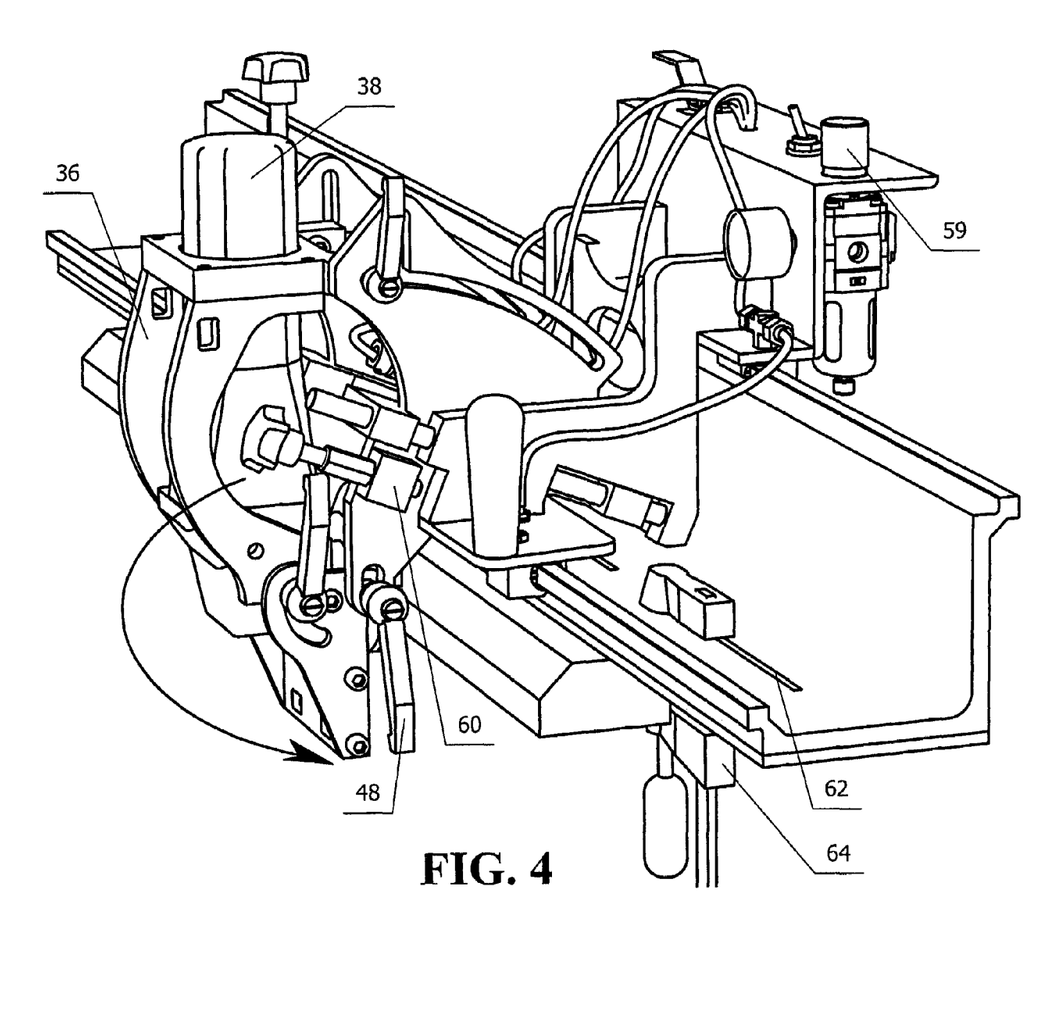
FIG. 4 is a front perspective view of the embodiment shown in FIG. 1 illustrating movement of the elevator plate for lowering the centerline of the rotary tool.
Figure 5:
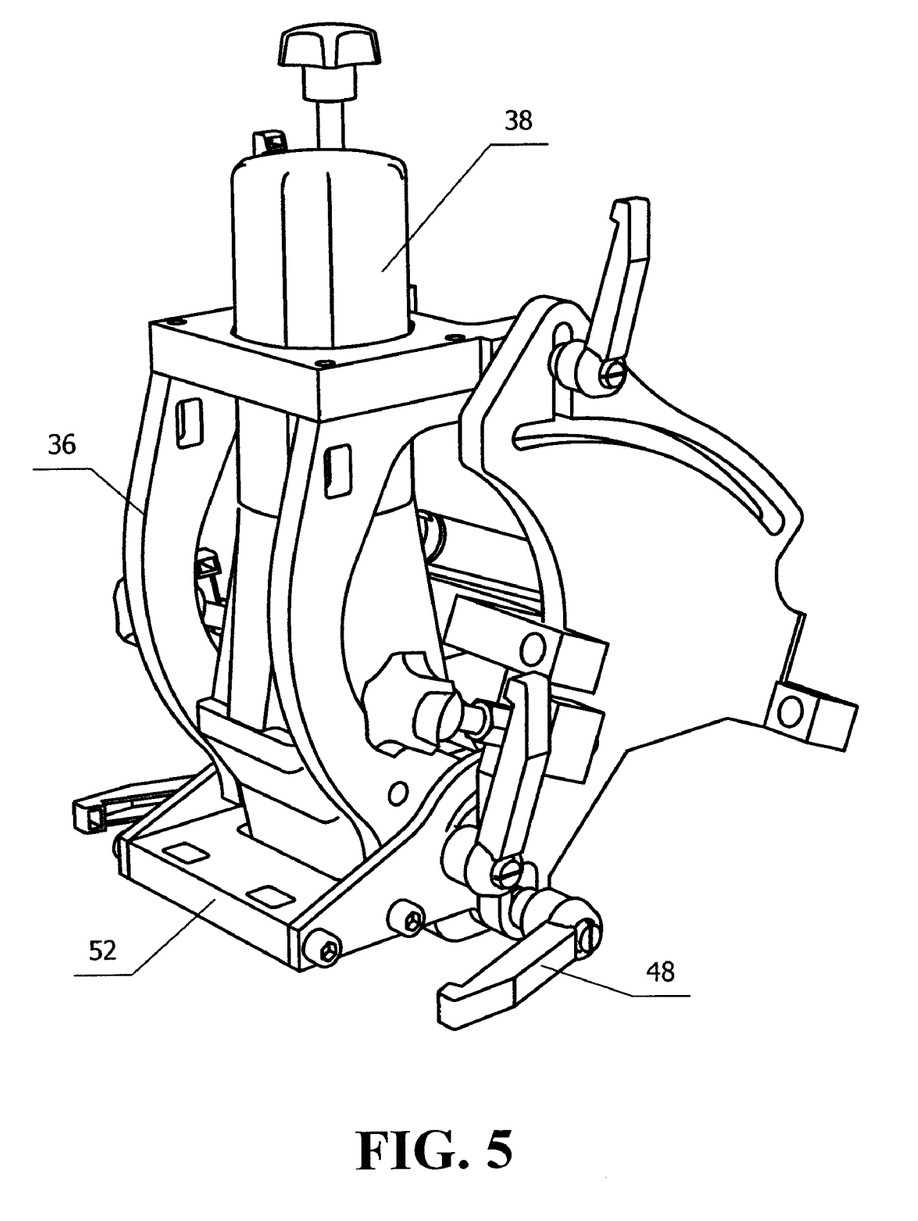
FIG. 5 is a partial front perspective view illustrating one embodiment of the second carriage.
Figure 6:
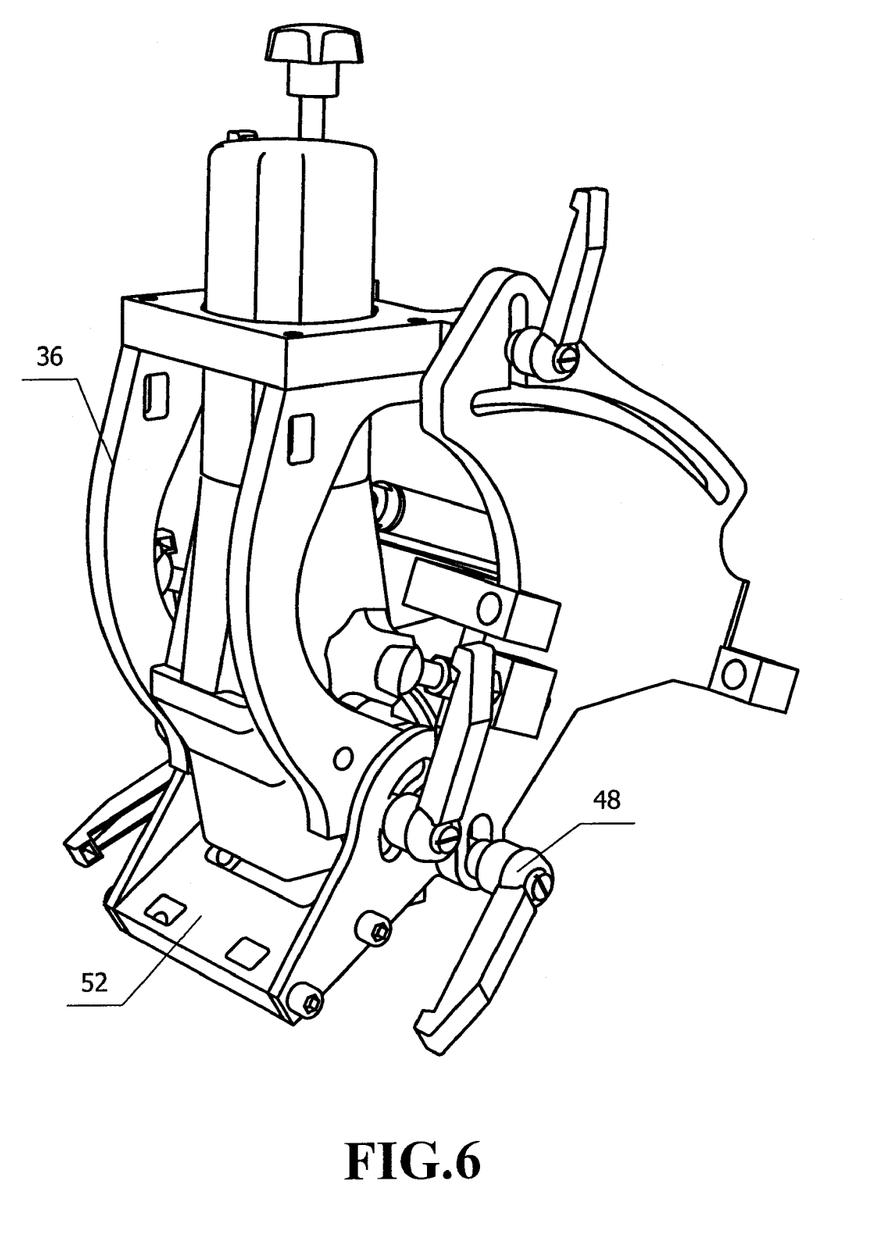
FIG. 6 is a partial front perspective view of one embodiment of the instant invention.
Figure 7:
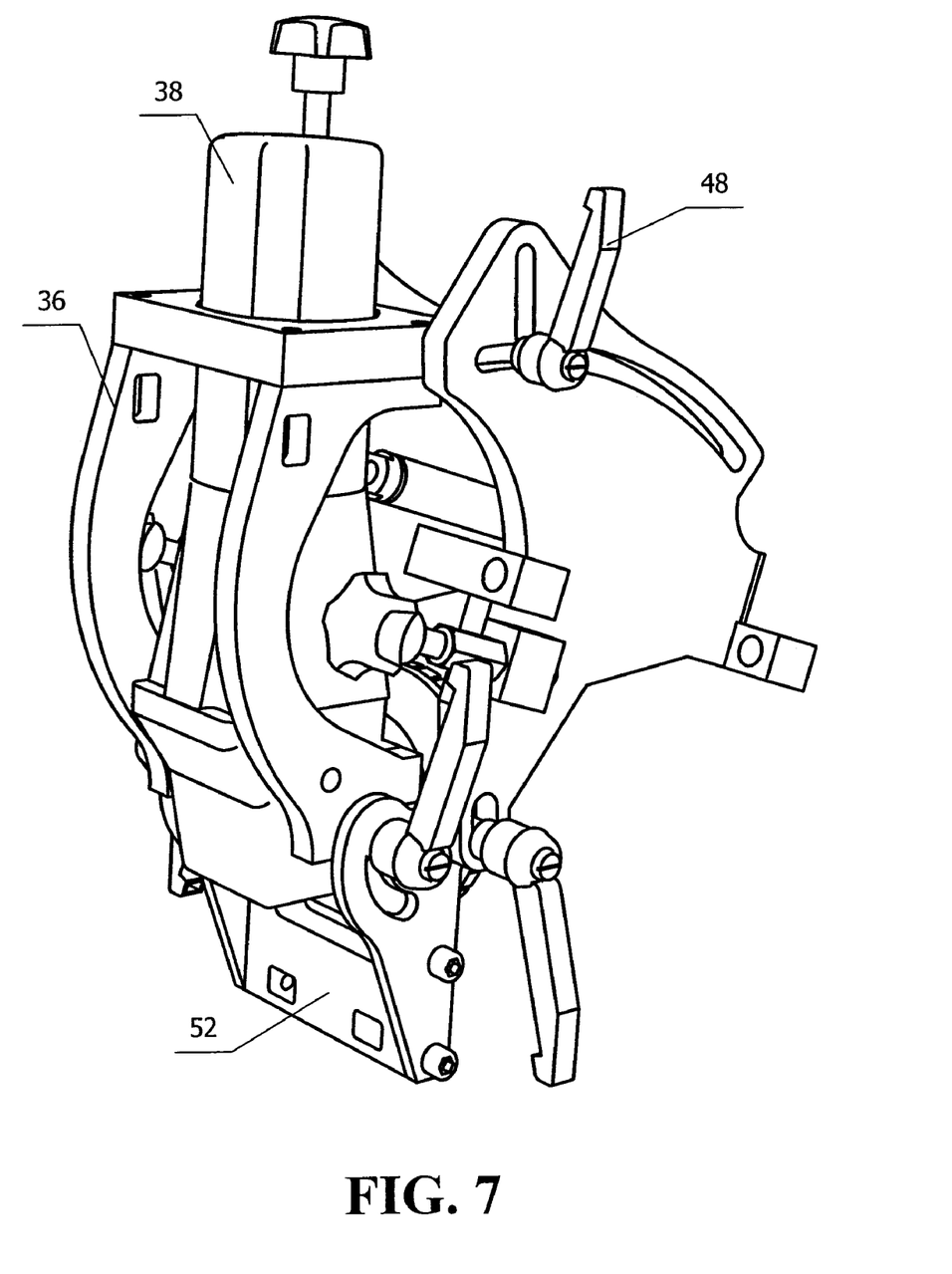
FIG. 7 is a partial front perspective view illustrating the elevator plate in its lowermost position.
Figure 8:
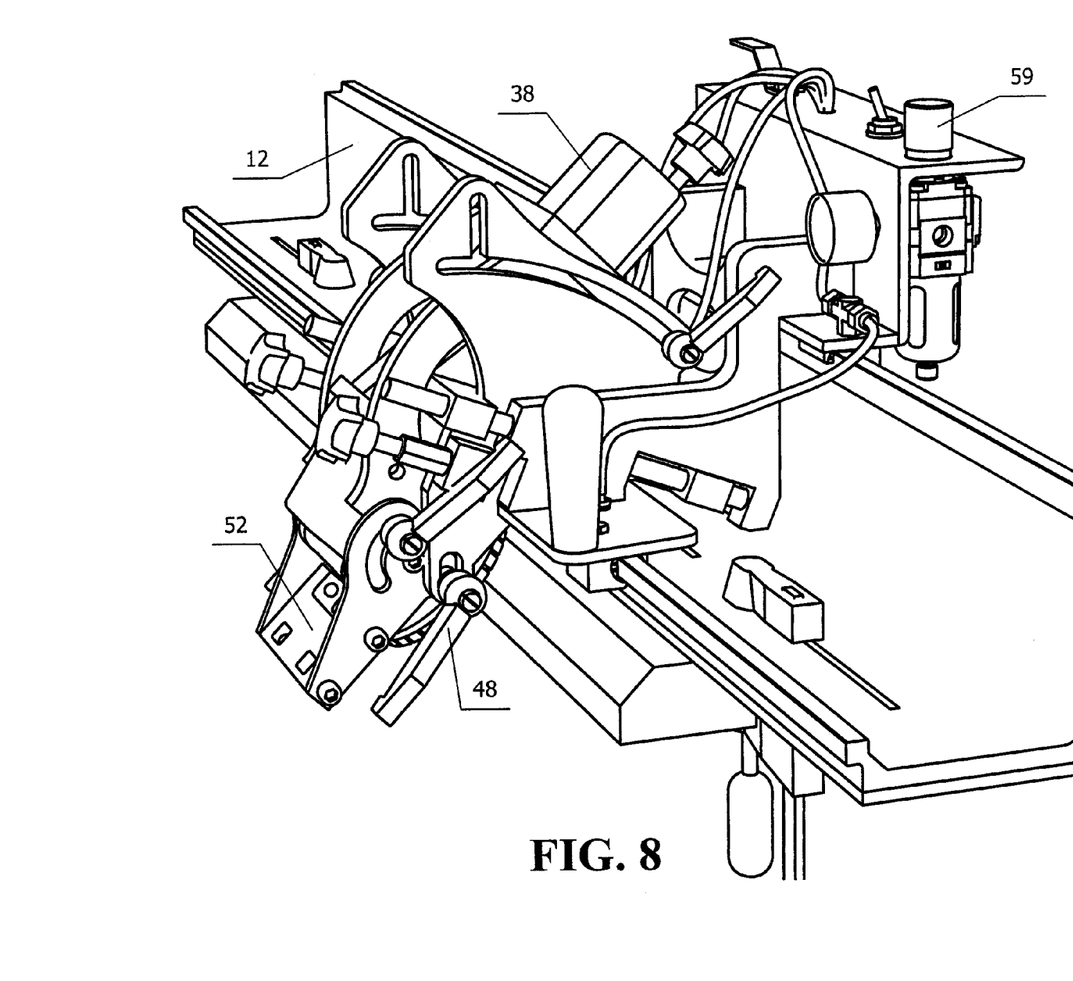
FIG. 8 is a front perspective view of one embodiment of the instant invention, illustrating the motor and rotary tool in a rotated position.

Referring to FIGS. 1-8, a preferred embodiment of the instant invention is illustrated. In this embodiment, the arcuate slots 44 each further include a vertical slot 50 and the bottom portion of the rotary tool is secured to a pivoting elevator plate 52. The elevator plate 52 is pivotable between a substantially horizontal position, as shown in FIG. 5, and a substantially vertical position, as shown in FIG. 7, whereby pivoting the elevator plate from the horizontal position to the vertical position causes the centerline of the rotary tool to move in a vertical manner. This construction is particularly adapted to allow the use of the outer periphery of the rotatable tool 34 for working along the upper surface of the workpiece as illustrated in FIG. 3, or the face of the rotatable tool may be utilized for working the edge of the material as illustrated in FIGS. 9-10. In addition, rotating knob 33 is provided to allow precise incremental upward and downward movements of the cutting tool and lock handles 66 allow the elevator plate to be locked into a desired position.

Referring to FIGS. 2, 3, 8-10, the first and second bearing surfaces 22, 24 are constructed as shaped extrusions having a hard surface coating. In a most preferred embodiment the bearing surfaces are square or rectangular in shape to prevent lifting and/or canting of the first carriage 26 as it is traversed. The first and second follower surfaces 28, 30 are preferably constructed from a polymeric material such as Teflon to include a substantially conjugate shape to the bearing surfaces. The follower surfaces are provided with a pressurized lubrication system 54. The pressurized lubrication system is constructed and arranged to deliver liquid under pressure to the follower surfaces during operation of the device to provide lubrication and flush away debris. In a most preferred embodiment, the pressurized lubrication system delivers water to the bearing surfaces, however oil or a combination of water and soluble oil may also be delivered to bearings without departing from the scope of the invention. The pressurized lubrication system may be provided with a manual flow control valve 56 or a solenoid valve 57 to control the flow of liquid to the bearing surfaces.

Figure 2:
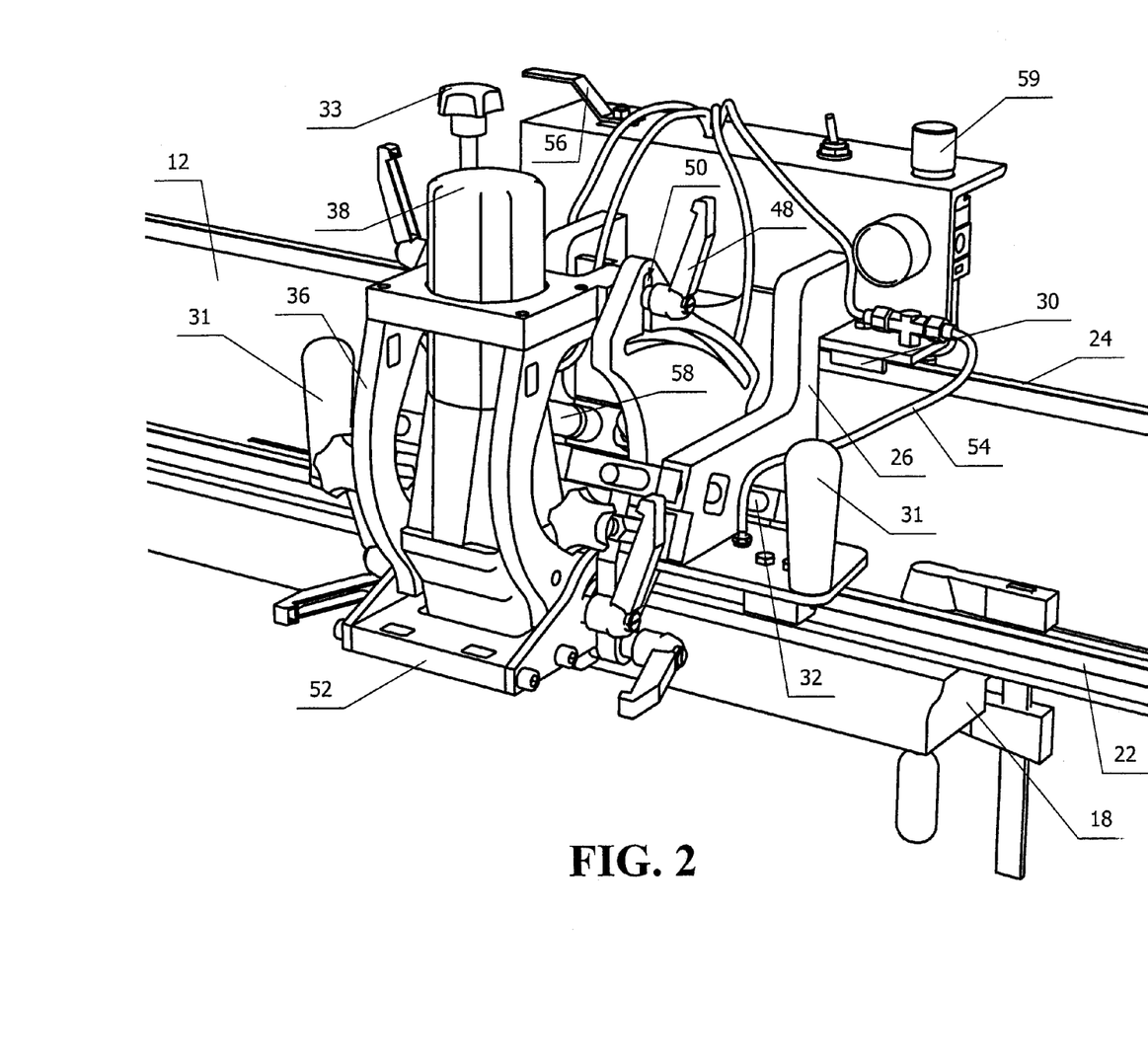
FIG. 2 is a partial front perspective view of one embodiment of the instant invention.

Referring to FIGS. 2 and 4, the finishing apparatus may include a pneumatic cylinder 58 connected between the first carriage 26 and the second carriage 36 for providing a motive force to cause the second carriage to move along the axis of approach into the workpiece. The pneumatic cylinder may cooperate with a regulator 59 and air lines 55 to allow an operator to establish a predetermined pressure between the workpiece and the rotatable tool. A stop 60 for limiting the movement of the carriage along the axis of approach may also be provided. In this manner, the operator can select a tool pressure and a stop point for the rotary tool prior to machining the edge of the hard material. The finishing apparatus can then be moved back and forth along the guide-way until the stop is reached. Uneven edges and the like are automatically compensated for by the pneumatic cylinder that allows for even tool pressure until the stop is met. The device is generally constructed and arranged to machine, but should not be limited to, man-made stone, natural stone, glass, concrete, ceramic and suitable combinations thereof.

It should be noted that in the preferred embodiments the components of the guide-ways, first carriage and second carriage are preferably constructed of aluminum having a hard anodized surface for oxidation control, wear properties and appearance. However, other materials well known in the art suitable for construction of the guide-ways, carriages and bearing surfaces could be utilized without departing from the scope of the invention. Such materials may include, but should not be limited to, metals, plastics, and suitable composites. It should also be noted that the guide-way can be constructed with slots 62 which cooperate with clamps 64 for securing the portable finishing apparatus to a piece of hard material.

It should also be noted that while the angle grinder is the preferred embodiment for rotation of the rotatable tool, other motors such as pneumatic motors, hydraulic motors, remote motors with cable drives and the like, suitable for providing smooth controlled rotation to the rotatable tool, may be utilized without departing from the scope of the invention.

It should also be noted that while the finishing device is illustrated with one rotatable tool, it is also considered to be within the scope of the invention to include more than one rotatable tool on the second carriage.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable apparatus for shaping and finishing an edge of a hard material comprising:
   a guide-way having a horizontal member constructed and arranged for being secured parallel with and juxtaposed to an upper surface of a hard material workpiece for providing rigidity in a first plane and a vertical member extending upwardly with respect to said upper surface of said workpiece for providing rigidity in a second plane, said horizontal member including a first bearing guide surface, said vertical member including a second bearing guide surface;
   a carriage slidably secured to said guide-way for movement along the length thereof, said carriage including at least one first bearing follower constructed and arranged for sliding cooperation with said first bearing surface, said carriage including at least one second bearing follower constructed and arranged for sliding cooperation with said second bearing surface, said carriage including a second linear guide-way defining an axis of approach for a rotatable tool, said second guide-way extending upward and outward at an acute angle with respect to said horizontal member;
   a second carriage slidably secured to said second guide-way, said second carriage constructed and arranged to support said rotatable tool;
   whereby said rotatable tool may be advanced into an edge of said workpiece along said axis of approach and whereby said carriage may be traversed along said guide-way for finishing an edge of said workpiece.

2. The apparatus of claim 1 wherein said axis of approach is at least three degrees.

3. The apparatus of claim 1 wherein said axis of approach is at least three degrees and less than eighty seven degrees.

4. The apparatus of claim 1 wherein said axis of approach is about twenty two and one half degrees.

5. The apparatus of claim 1 wherein said second carriage includes a motor for rotating said rotatable tool.

6. The apparatus of claim 5 wherein said motor and said rotatable tool are components of an angle grinder.

7. The apparatus of claim 1 wherein said first and said second bearing followers are provided with pressurized fluid having a substantially constant flow to provide lubrication and flush away debris.

8. The apparatus of claim 1 wherein said pressurized fluid is water.

9. The apparatus of claim 1 wherein said first and said second bearing surfaces are constructed as shaped extrusions having a hard surface coating.

10. The apparatus of claim 9 wherein said extrusions are formed from aluminum and said hard surface coating is hard anodizing.

11. The apparatus of claim 1 wherein said first and said second follower surfaces are constructed from a polymeric material.

12. The apparatus of claim 1 including a pneumatic cylinder connected between said first carriage and said second carriage for providing a motive force to cause said second carriage to move along said axis of approach into said workpiece.

13. The apparatus of claim 12 wherein said pneumatic cylinder cooperates with a regulator to allow an operator to establish a predetermined pressure between said workpiece and said rotatable tool.

14. The apparatus of claim 12 including a stop for limiting said movement of said second carriage along said axis of approach.

15. The apparatus of claim 1 wherein said second carriage includes two substantially parallel plates, a top portion of said plates including an arcuate slot for attachment of a top portion of a rotatable tool, a bottom portion of said plate including an aperture and pin arrangement defining an axis of rotation for attachment of a bottom portion of said rotatable tool, whereby said top portion of said rotary tool may be pivoted throughout said arcuate slots for tilting said rotary tool.

16. The apparatus of claim 14 wherein said arcuate slots further include a vertical slot and wherein said bottom portion of said rotatable tool is secured to a pivoting elevator plate, said elevator plate pivotable between a substantially horizontal position and a substantially vertical position, whereby pivoting said elevator plate from said horizontal position to said vertical position causes said rotatable tool to move in a vertical manner.

17. The apparatus of claim 1 wherein said hard material is selected from the group consisting of man-made stone, natural stone, glass, concrete and ceramic.

18. The apparatus of claim 1 wherein said second carriage is constructed and arranged to support more than one rotatable tool.

* * * * *